(12) United States Patent
Benmoussa

(10) Patent No.: US 8,880,315 B2
(45) Date of Patent: Nov. 4, 2014

(54) METHOD OF MANAGING THE BRAKING OF AN AIRCRAFT TO LIMIT ITS PITCH

(71) Applicant: Messier-Bugatti-Dowty, Velizy-Villacoublay (FR)

(72) Inventor: Michael Benmoussa, Velizy-Villacoublay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 38 days.

(21) Appl. No.: 13/682,114

(22) Filed: Nov. 20, 2012

(65) Prior Publication Data

US 2013/0297167 A1    Nov. 7, 2013

(30) Foreign Application Priority Data

Nov. 22, 2011    (FR) ...................................... 11 60663

(51) Int. Cl.
| | |
|---|---|
| *B60T 17/00* | (2006.01) |
| *B60T 8/50* | (2006.01) |
| *B60T 8/24* | (2006.01) |
| *B60T 8/26* | (2006.01) |
| *B60T 8/00* | (2006.01) |
| *B60T 7/12* | (2006.01) |
| *B60T 8/1755* | (2006.01) |
| *B60T 8/17* | (2006.01) |
| *B64C 25/42* | (2006.01) |
| *B60T 8/172* | (2006.01) |
| *B60T 8/32* | (2006.01) |

(52) U.S. Cl.
CPC . *B60T 17/00* (2013.01); *B60T 8/50* (2013.01); *B60T 8/246* (2013.01); *B60T 8/26* (2013.01); *B60T 8/00* (2013.01); *B60T 7/12* (2013.01); *B60T 8/1755* (2013.01); *B60T 8/1703* (2013.01); *B60T 8/245* (2013.01); *B64C 25/426* (2013.01); *B60T 8/172* (2013.01); *B60T 8/24* (2013.01); *B60T 8/325* (2013.01)
USPC ................................... 701/70; 701/3

(58) Field of Classification Search
CPC ...... B64C 25/42; B64C 25/426; B64C 25/44; B64C 25/445; B64C 25/46; B64C 25/48; B06T 7/12; B06T 17/00; B06T 8/00; B06T 8/172; B06T 8/1755; B06T 8/1703; B06T 8/26; B06T 8/325; B06T 8/245; B06T 8/246
USPC ................. 701/70, 3; 303/126; 340/467, 441; 244/111, 50
See application file for complete search history.

(56) References Cited

U.S. PATENT DOCUMENTS

| | | | | |
|---|---|---|---|---|
| 4,646,242 | A | * | 2/1987 | Valaas .............................. 701/70 |
| 5,136,510 | A | * | 8/1992 | Beck ................................ 701/70 |

(Continued)

FOREIGN PATENT DOCUMENTS

| | | |
|---|---|---|
| EP | 1 496 413 A1 | 1/2005 |
| EP | 1 759 989 A1 | 3/2007 |

(Continued)

OTHER PUBLICATIONS

French Search Report of FR 1 160 663 dated Sep. 6, 2012.

*Primary Examiner* — Marthe Marc-Coleman
(74) *Attorney, Agent, or Firm* — Sughrue Mion, PLLC

(57) ABSTRACT

A method of managing the braking of an aircraft 1 having at least one controllable brake 9 for braking the aircraft 1 when the aircraft 1 is on the ground and as a function of a braking setpoint C. The method includes correcting the braking setpoint as a function of the pitch angle $\theta$ of the aircraft 1 during braking.

2 Claims, 5 Drawing Sheets

(56) References Cited

U.S. PATENT DOCUMENTS

| | | | |
|---|---|---|---|
| 7,708,223 B2 * | 5/2010 | Mathieu | 244/50 |
| 2005/0006524 A1 | 1/2005 | Villaume et al. | |
| 2007/0084677 A1 | 4/2007 | Thibault et al. | |
| 2007/0271019 A1 | 11/2007 | Dellac et al. | |
| 2010/0076623 A1 | 3/2010 | Lamoussiere | |

FOREIGN PATENT DOCUMENTS

| | | |
|---|---|---|
| EP | 1 834 875 A1 | 9/2007 |
| FR | 2 929 242 A1 | 10/2009 |
| WO | 85/03367 A1 | 8/1985 |

\* cited by examiner

METHOD OF MANAGING THE BRAKING OF AN AIRCRAFT TO LIMIT ITS PITCH

The invention relates to a method of managing the braking of an aircraft so as to limit its pitch.

BACKGROUND OF THE INVENTION

Most aircraft have landing gear with a plurality of undercarriages having the essential functions firstly of absorbing a large portion of the kinetic energy due to the vertical component of the speed of the aircraft on landing, and secondly of enabling the aircraft to travel on the ground, in particular during the braking stage to which the present invention relates.

A distinction is generally made between so-called "main" landing gear that supports the major portion of the weight of the aircraft, and so-called "auxiliary" landing gear that serves to balance the aircraft on the ground and to make it more maneuverable. On most modern aircraft, the main landing gear is situated close to the center of gravity of the airplane under the wing or under the fuselage, while the auxiliary landing gear is situated under the nose of the aircraft.

Landing gear generally includes shock absorbers for absorbing energy when the airplane impacts the ground and for ensuring passenger comfort while running on the ground, together with at least one wheel and braking elements, with braking elements usually being mounted solely on the "main" landing gear.

Aircraft braking systems include braking actuators (which may be hydraulic or electromechanical) that are controlled to apply braking torque to the wheels of the aircraft, tending to slow it down.

Most braking controls known in aviation make use of a general setpoint for torque, force, or position, with that being translated either into a pressure for hydraulic brakes, or into a force that is to be applied or into a movement of a pusher for brakes having electromechanical actuators.

At the beginning of braking, the deceleration created by the braking force induces an inertial force on the wheels that causes the aircraft to tilt forwards about a "pitch" axis of the aircraft. This tilting has the consequence of compressing the shock absorber of the auxiliary landing gear.

At the end of braking, when the aircraft comes completely to rest, the shock absorber of the auxiliary landing gear relaxes and thereby causes the aircraft to tilt once more, this time rearwards about the pitch axis.

These tilting movements are phenomena that are particularly uncomfortable for the passengers of the airplane.

OBJECT OF THE INVENTION

An object of the invention is to provide a method of managing the braking of an aircraft that serves to improve the comfort of the passengers of the aircraft.

BRIEF DESCRIPTION OF THE INVENTION

In order to achieve this object, the invention provides a method of managing the braking of an aircraft that includes at least one controllable brake for braking the aircraft when the aircraft is on the ground and as a function of a braking setpoint. According to the invention, the method of managing braking includes correcting the braking setpoint as a function of a pitch angle of the aircraft during braking.

Thus, by reducing the braking setpoint when the aircraft is detected as pitching, any tilting of the aircraft from front to rear or from rear to front is limited, thereby improving the comfort of passengers.

BRIEF DESCRIPTION OF THE DRAWINGS

The invention can be better understood in the light of the following description made with reference to the figures of the accompanying drawings, in which.

DETAILED DESCRIPTION OF THE INVENTION

Figure 1:
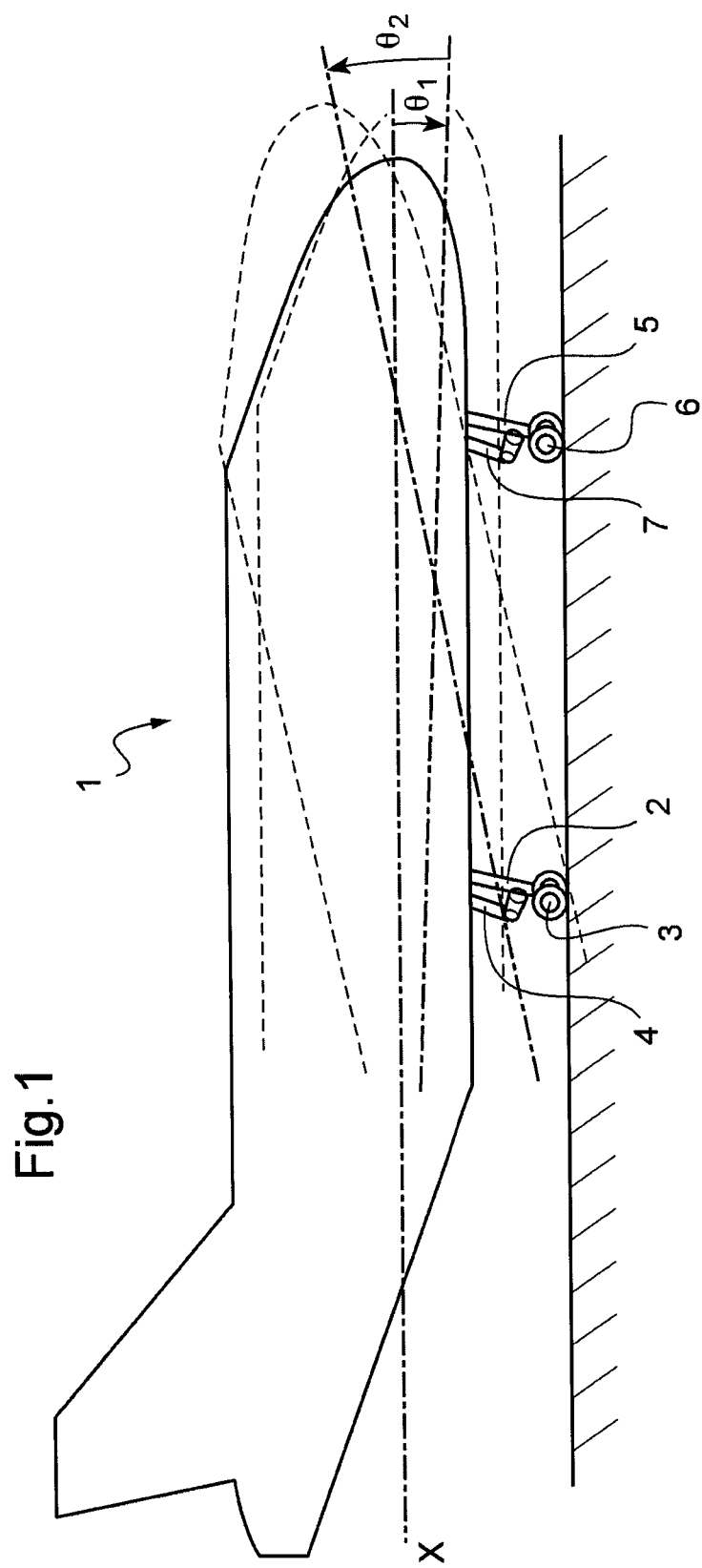
FIG. 1 is a diagrammatic side view of an aircraft while braking after landing, the continuous-line profile corresponding to the aircraft without braking, and the dashed-line profiles corresponding to the aircraft at the beginning and at the end of braking.

With reference to FIG. 1, an aircraft 1 includes main landing gear 2 having a set of wheels 3 and a shock absorber 4, and also auxiliary landing gear 5 having a set of wheels 6 and a shock absorber 7. Only the wheels 3 of the main landing gear 2 are provided with brakes.

An axis X is defined, commonly referred to as the longitudinal reference of the aircraft. When the aircraft 1 is stationary on the ground, the longitudinal reference X is substantially parallel to the ground.

At the beginning of braking, the aircraft 1 tilts a first time through an angle $\theta_1$, with the nose of the aircraft moving down.

At the end of braking, the aircraft 1 tilts a second time through an angle $\theta_2$ in the opposite direction.

Figure 2:
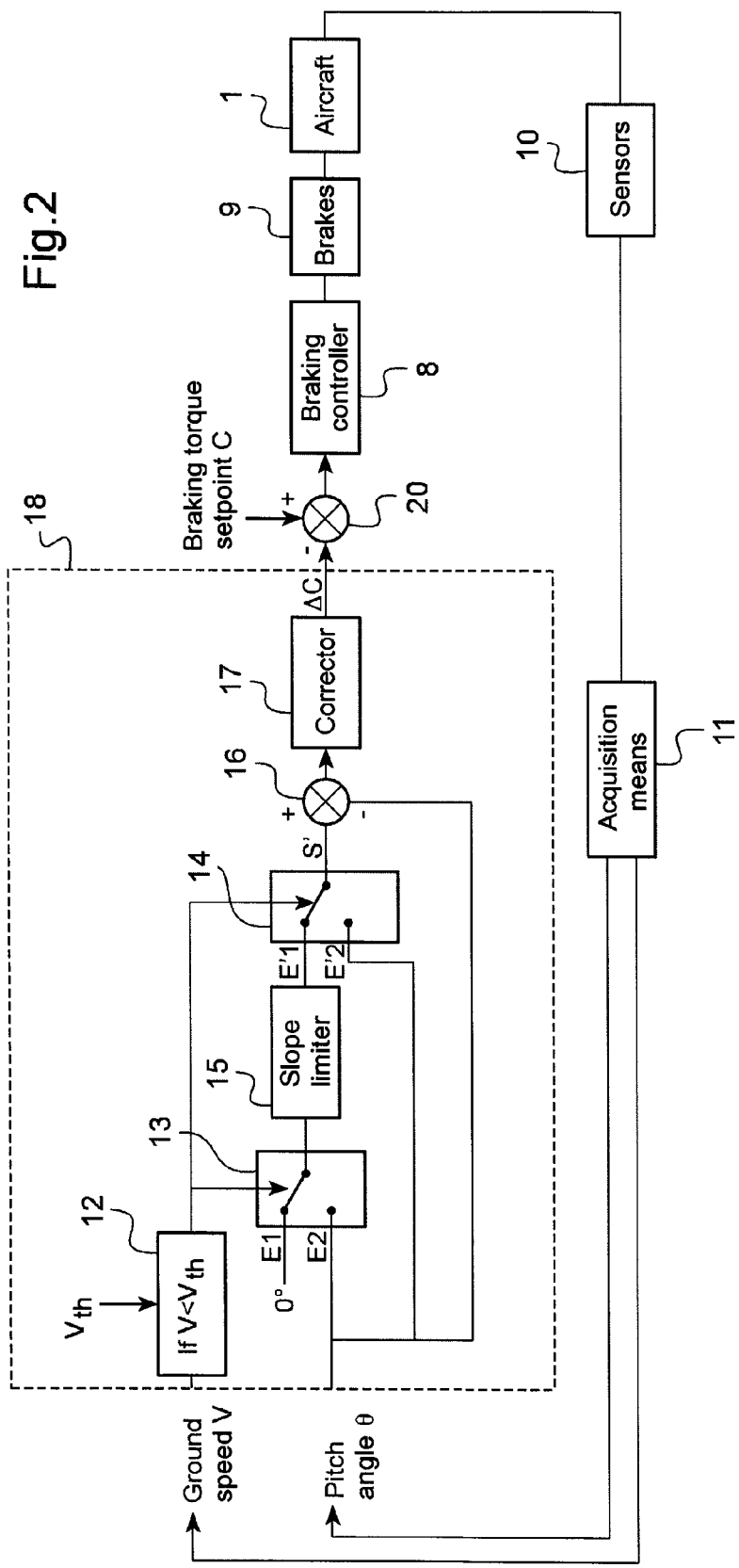
FIG. 2 is a block diagram showing one particular implementation of the method of the invention for managing braking.

The braking management method of the invention shown diagrammatically in FIG. 2 is particularly adapted to processing the second tilting movement of the aircraft through an angle $\theta_2$, referred to herein as the return tilting.

As mentioned above, this return tilting $\theta_2$ takes place at the end of braking when the ground speed V of the aircraft 1 is relatively low. The braking management method of the invention makes provision to activate a braking correction function solely when the ground speed V of the aircraft 1 is less than a threshold speed $V_{th}$.

The braking correction function is performed for example in a braking computer of the aircraft. It seeks to correct a braking setpoint, in this example a torque setpoint C, by estimating a correction torque $\Delta C$ for the braking torque setpoint C as a function of the pitch angle $\theta$, for the purposes of reducing the return tilt angle $\theta_2$ and also of reducing the rate at which it varies (referred to below as the "return pitching rate").

This is explained below in greater detail with reference to FIG. 2.

The brakes 9 of the wheels 3 of the main landing gear 2 are controlled by a controller 8 in application of a braking setpoint in order to slow the aircraft 1 such that its ground speed V becomes substantially zero at the end of braking. The way in which the torque setpoint C is generated is well known and does not form part of the invention. By way of example, the controller 8 is an electromechanical actuator controller (EMAC) if the brakes are of the electromechanical type, or a hydraulic unit provided with a servo-valve if the brakes are of the hydraulic type. The values of several parameters representative of the state of the aircraft 1 are measured by sensors 10 and acquired by acquisition means 11, said sensors 10 and acquisition means 11 possibly being integrated in a system that includes in particular an inertial unit. These parameters generally include the ground speed V of the aircraft and its accelerations and angles in roll, in yaw, and in pitch $\theta$.

The braking correction function in this example is represented by a plurality of functional blocks, including:
- a speed comparator 12;
- a first changeover switch 13 having two inputs E1 and E2 and one output S, and a second changeover switch 14 having two inputs E'1 and E'2 and one output S';
- a slope limiter 15;
- a subtracter 16; and
- a corrector 17.

All of these functional blocks are incorporated in a functional block referred to below as the "braking correction block" 18.

The braking correction block 18 has as inputs the ground speed V of the aircraft 1 and the measured value of its pitch angle $\theta$.

Within the braking correction block 18, the speed comparator 12 acquires the ground speed V of the aircraft 1 and controls the changeover switches 13 and 14 as a function of the value of this speed V relative to a constant value $V_{th}$.

In order to perform the braking management method described herein, the value selected for $V_{th}$ is 3 meters per second (m/s).

The blocks 12, 13, 14, 15, 17, and the subtracter 16 are arranged within the braking correction block 18 as follows:
- the input E1 of the first changeover switch 13 has a value representing an angle of 0°;
- the input E2 of the first changeover switch 13 has a value representing the pitch angle $\theta$;
- the output S of the first changeover switch is connected to the input E1 if the speed V is less than $V_{th}$, and to the input E2 if the speed V is greater than or equal to $V_{th}$;
- the input of the slope limiter 15 is connected to the output S of the first changeover switch 13;
- the output of the slope limiter is connected to the input E'1 of the second changeover switch 14;
- the value at the input E'2 of the second changeover switch 14 is representative of the pitch angle $\theta$;
- the value at the output S' of the second changeover switch 14 is connected to its input E'1 if the ground speed V is less than $V_{th}$, and to its input E'2 if the ground speed V is greater than or equal to $V_{th}$;
- the subtracter 16 subtracts the value of the pitch angle $\theta$ from the value at the output S' of the second changeover switch 14 and forwards the value it obtains to the corrector 17; and
- the corrector 17 then generates the correction torque value $\Delta C$ that is to be subtracted from the braking torque setpoint C.

Thus, when the ground speed V of the aircraft is greater than or equal to $V_{th}$, the subtracter 16 subtracts the value of the fixed angle $\theta$ from itself, so the corrector 17 receives a value representing an angle of 0° and therefore generates a correction torque value $\Delta C$ of zero.

When the speed V drops below the threshold $V_{th}$, the value at the output S from the first changeover switch 13 becomes equal to 0° and the output S' of the second changeover switch 14 takes the value at the output from the slope limiter 15; thus, as a function of the pitch angle $\theta$ and of the speed V, the controller generates a correction torque value $\Delta C$ that is not zero.

The correction torque $\Delta C$ is then subtracted by a subtracter 20 from the braking torque setpoint C so that the magnitude of the braking is reduced a little and progressively until the aircraft comes fully to rest.

The slope limiter 15 avoids the correction 17 generating a correction torque value $\Delta C$ that would tend to cause the pitch angle $\theta$ to change suddenly from its value to 0°, which would give rise to a variation in the braking setpoint C that is too fast. Thus, starting from the value of the pitch angle $\theta$ when the speed V becomes equal to $V_{th}$, the slope limiter 15 generates a slope that makes it possible to go from the pitch angle $\theta$ to 0° in a length of time that is reasonable, thereby enabling the braking to be reduced progressively so as to reduce the pitch angle $\theta$ progressively.

Figure 3:
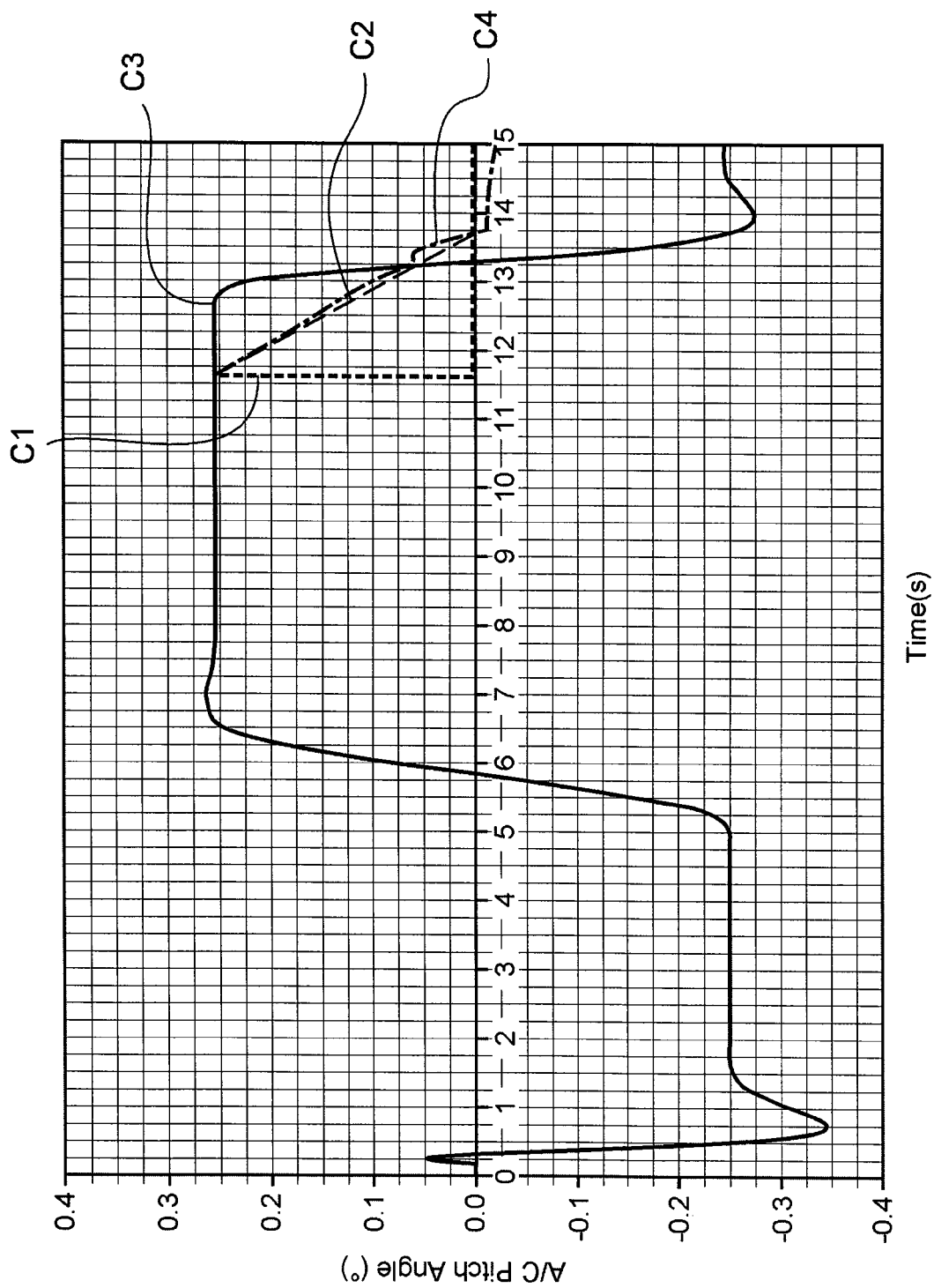
FIGS. 3, 4, and 5 are graphs showing the pitch-reduction performance obtained by applying the braking management method of the invention.
Figure 4:
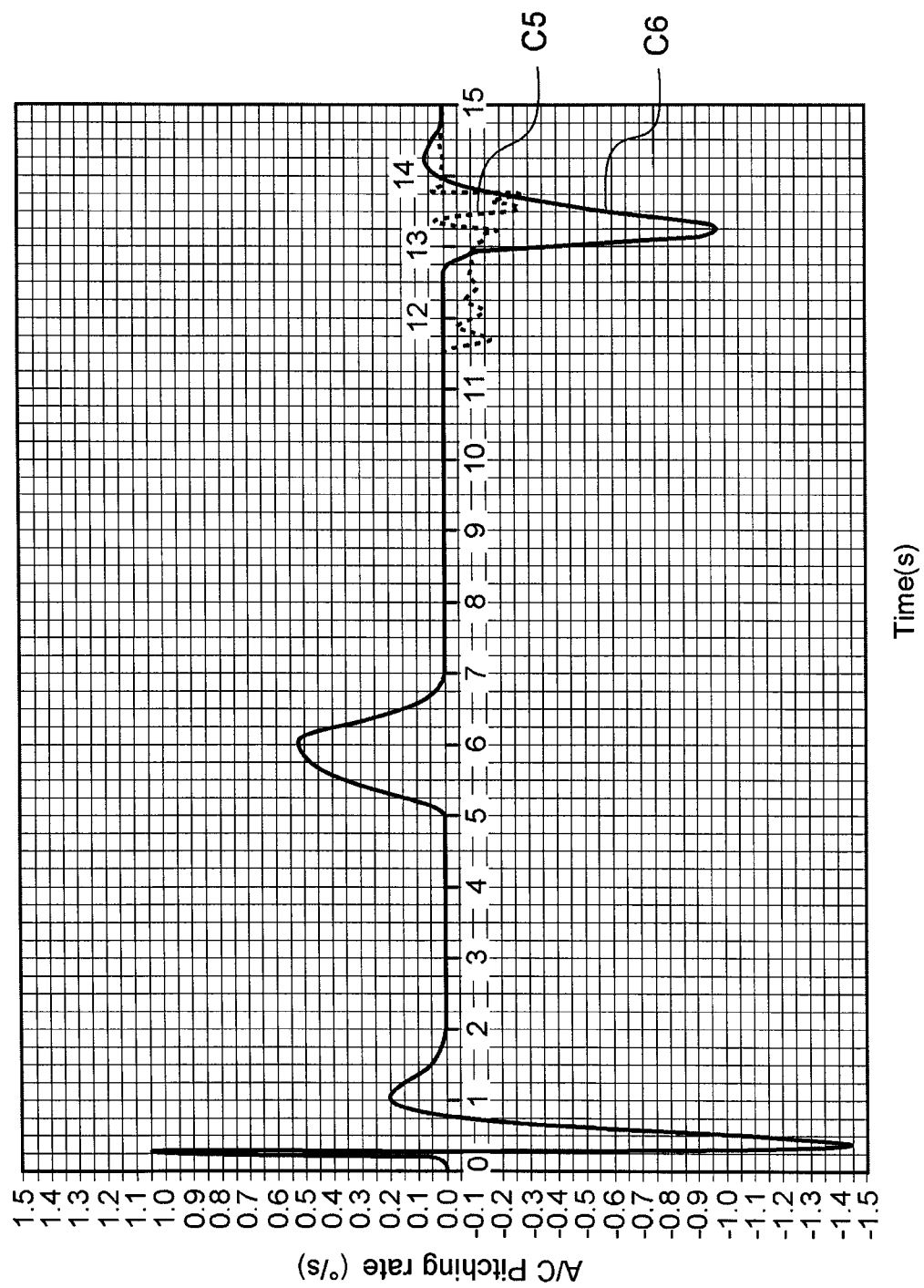

The curves of FIGS. 3 and 4 show the results of simulating braking, and they make it possible to assess the performance of the braking management method of the invention. The aircraft of the simulation was a single-aisle commercial type airplane. An aircraft running on the ground without braking at a speed of 15 m/s was initially simulated for the first 5 seconds (s). Thereafter, a braking command was applied in order to create constant deceleration of about 2 meters per second squared (m/s$^2$) until the aircraft came to rest.

FIG. 3 shows the variation in the value of the pitch angle $\theta$ (the ordinate axis is graduated in degrees) as a function of time (the abscissa axis is graduated in seconds).

In FIG. 3:
- the curve C1 represents the value at the output S of the first changeover switch 13;
- the curve C2 represents the output from the slope limiter 15;
- the curve C3 represents the value of the pitch angle of the aircraft 1 without applying the braking management method of the invention; and
- the curve C4 represents the value of the pitch angle of the aircraft 1 when the braking management method of the invention is applied.

The curve C2 thus represents the variation in the pitch angle $\theta$ that the braking management method seeks to achieve; this slope tends to cause the pitch angle to go from about 0.25° to about 0° in about 2 s, and it represents a change that is less sudden than that represented by the curve C1. The way in which the simulated pitch $\theta$ of the aircraft 1 varies as a function of applying the braking management method is represented by the curve C4. This variation is very close to that of the curve C2, and firstly it is less sudden than the variation in the pitch angle $\theta$ represented by the curve C3, and secondly it extends to a return tilt $\theta_2$ of amplitude that is much smaller than that of the curve C4 ($\approx 0.025°$ instead of $\approx 0.25°$).

FIG. 4 shows variation in the pitching rate (the ordinate axis is graduated in degrees per second) as a function of time (the abscissa axis is graduated in seconds). The pitching rate represents a rate of variation in the pitch angle $\theta$, i.e. the tilting speed: the greater this value, the greater the discomfort for the passengers. The curve C5 shows how the pitching rate varies when the braking management method of the invention is applied, while the curve C6 shows how the pitching rate varies when the braking management method of the invention is not applied. It can be seen that, at the end of braking, the pitching rate is about five times greater when the braking management method is not applied.

Figure 5:
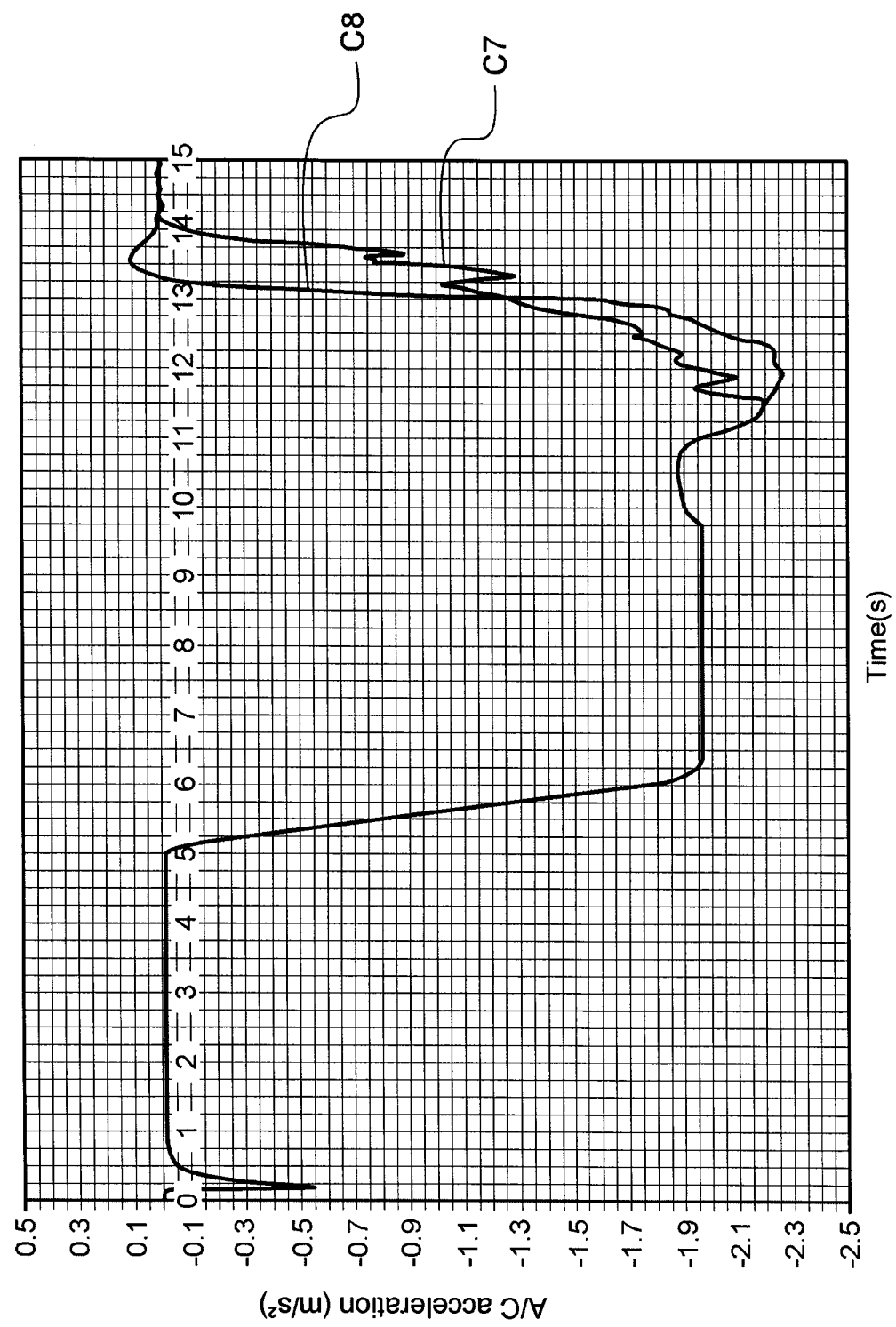

FIG. 5 shows how the longitudinal acceleration of the aircraft along the axis X varies (with the ordinate axis being graduated in meters per second squared) as a function of time (the abscissa axis is graduated in seconds). The curve C7 shows how the acceleration of the aircraft varies when the braking management method of the invention is applied, while the curve C8 shows how the acceleration of the aircraft varies when the braking management method of the invention is not applied. At the end of braking, acceleration becomes slightly positive when the braking management method is not applied, which corresponds to the aircraft tilting from front to rear. When the method is applied, acceleration remains negative until the aircraft stops, and the tilting does not occur.

It is of interest to observe that the increase in the braking distance that results from using the braking management method of the invention is relatively short (less than 1 meter in this simulation).

The invention is not limited to the particular implementation described above, but on the contrary covers any variant coming within the ambit of the invention as defined by the claims.

It can be seen in FIGS. 3 and 4 that the pitch angle and the pitching rate are unchanged at the beginning of braking. In the implementation of the invention described herein, the pitch angle is processed only at low speed ($V<V_{th}$), which does not reduce the front to rear tilting that is felt at the beginning of braking. It is naturally possible to apply the pitch angle processing regardless of the ground speed of the aircraft.

All of the numerical values given in the text of the description or in the figures are given by way of example, and the invention may be implemented with other values, in particular concerning the value of $V_{th}$ and for the value of the slope provided by the slope limiter.

As a replacement for or in addition to the pitch angle slope limiter, it is possible to use a limiter of the torque correction to be subtracted from the braking setpoint, the purpose being to restrict any variation in the correction of the setpoint.

Naturally, the invention applies to braking management methods in which the actuators of the brakes are controlled not in torque but in force, or in position, or in application of any other physical parameter.

What is claimed is:

1. A method of managing the braking of an aircraft having a braking computer and at least one brake controllable by said braking computer for braking the aircraft when the aircraft is on the ground and as a function of a braking setpoint, the method comprising:
   correcting the braking setpoint as a function of a pitch angle of the aircraft during braking, and
   wherein said correction is performed by subtracting a correction value from the braking setpoint, which correction value is:
   calculated by the braking computer as a function of the pitch angle if the aircraft is running at a ground speed less than a threshold speed; and
   set to zero if the ground speed is greater than or equal to the threshold speed.

2. A method according to claim 1, wherein the correction of the braking setpoint includes a step of limiting any variation to the correction of the setpoint.

* * * * *